/ Patented Sept. 22, 1953

2,653,136

UNITED STATES PATENT OFFICE 2,653,136

SURFACE ACTIVE COMPOUNDS

William B. Hughes, Bartlesville, Okla., assignor to Cities Service Oil Company, Bartlesville, Okla., a corporation of Delaware No Drawing. Application June 14, 1950, Serial No. 168,160

5 Claims. (Cl. 252—338)

This invention relates to new compositions of matter having surface active properties and more particularly to certain amine salts of substituted naphthalene sulfonic acids which are particularly useful in the breaking of emulsions such as oil field emulsions.

Reference is made to my copending applications Serial No. 131,699 filed December 3, 1949, and Serial No. 168,159, filed concurrently herewith (both now abandoned), in which the compounds of the present invention are disclosed but not claimed.

One of the most troublesome problems met with in crude oil production relates to the breaking of water-in-oil emulsions formed in wells producing both water and brine. These emulsions are generally of two types, the first type a mechanically cut emulsion, which is usually formed in the well by faulty pumping equipment, the other type being a gas-cut emulsion, the formation of which is aided by the emulsifying action of certain asphaltenes and other chemical emulsifiers present in the crude oil. The emulsion commonly encountered is a mixture of both of these types, and its properties will vary from well to well, and even from day to day in the same well. Unless these emulsions can be effectively and completely broken, the oil content is lost. It is also desirable that the emulsion be broken as rapidly as possible, in order to keep the number and size of the settling tanks to a minimum.

There are apparently two phases of an emulsion resolving problem. The first involves a surface phenomenon in which the oil film surrounding the water particles of micron size is weakened, allowing the particles to coalesce into larger droplets. This phase will be hereinafter referred to as the emulsion breaking step. The other phase involves the splitting of the broken emulsion into separate oil and water phases. This phase will be referred to as the water separation step.

It will be evident from the foregoing that the ideal emulsion resolving agent must be effective to break both mechanical-cut and gas-cut emulsions with substantially equal facility, must rapidly break the emulsion, and must be effective in causing rapid water separation from the broken emulsion. The agent must also be effective in very small concentrations, in order to hold the treating cost to a minimum. Many emulsion resolving agents have been proposed in the past, but none of which I am aware are effective to accomplish all of the desired results. Thus one agent may be effective to break gas-cut emulsions, but not the mechanical-cut type; another may be a good emulsion breaker but have poor water separation qualities; while still another may show good water separation qualities but may fail to break the emulsion completely.

It is an object of this invention to provide a series of compounds which will rapidly resolve emulsions of all types, giving rapid break and complete water separation.

It has been found that emulsion resolving agents which will accomplish the foregoing object may be produced by neutralizing to a methyl orange end point a carbonyl-polyamine condensation product with a propylated naphthalene sulfonic acid.

The condensation product which I use as an intermediate in the preparation of these new compounds is prepared by reacting one mol of an aldehyde or a ketone with two mols of an amine. The exact structure of the resulting compound is not known since there are a number of possibilities, depending upon which nitrogen hydrogen of the amine reacts with the oxygen atom of the carbonyl. For example, if diethylene triamine were to be reacted with formaldehyde, it would be possible to have compounds of the following theoretical structures:

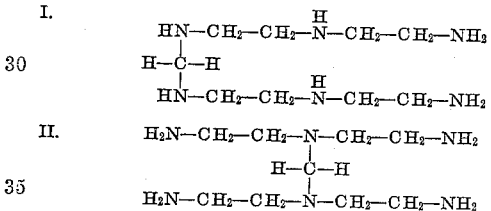

While it is believed that the terminal nitrogen of the polyamine would probably be the most reactive, to give the structure shown in Formula I, I do not wish to be limited to this particular structure since other structures are possible from the reaction.

When the amine and an aldehyde are mixed, the reaction commences spontaneously and will normally go to completion at room temperatures within a matter of a few hours. I have found it desirable, however, to heat the mixture in order to speed up the reaction and to insure that it goes to completion. When heated to about 100° C. the reaction is complete in about one-half hour. The product, an oily liquid, may then be separated from the water formed in the reaction by any suitable method such as centrifuging or decanting. When using a ketone as a reagent instead of an aldehyde, the reaction is slower and for this reason I prefer to use a catalytic quantity of an acid such as paratoluene sulfonic acid to initiate the reaction, although it is not absolutely necessary. After the reaction is started the material is treated in the same way as when using an aldehyde and a very similar product is obtained. Any polyethylene amine, such as diethylenetriamine, triethylenetetramine, or tetraethylene pentamine may be used with apparently very similar results.

The nature and molecular weight of the carbonyl component of my new compounds is not critical, and may be alkyl, aryl, or heterocyclic. For example, I have obtained good results when using formaldehyde, acetaldehyde, benzaldehyde, heptaldehyde, and ethyl hexaldehyde, and among the ketones, acetone, methyl ethyl ketone, diethyl ketone, di isopropyl ketone, acetophenone, and methyl isobutyl ketone. I do not wish, however, to be limited in the practice of my invention to the above specifically mentioned aldehydes and ketones, since any aldehyde or ketone is apparently satisfactory.

The propylated naphthalene sulfonic acid which I use as the neutralizing agent for my intermediate compounds may be prepared according to the directions given by Walker in U. S. Patent No. 1,873,165. The compound has the formula:

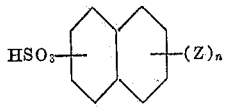

in which Z is an isopropyl radical and $n$ is a whole number from 1 to 4. Other organic acids, such as stearic acid and petroleum green acids have been tried as neutralizers, but the products are far infereior in emulsion-breaking qualities.

The propylated naphthalene sulfonic acid is preferably used in a molar equivalent with the number of nitrogens present in the carbonylamine intermediate condensation product. For example, if diethylene triamine were used as the amine component the intermediate product would be neutralized with 6 mols of propylated naphthalene sulfonic acid, whereas if triethylene tetramine were used, 8 mols of the acid would be necessary to neutralize the compound to a methyl orange end point. Neutralization is accompanied by the evolution of considerable heat, and by a definite color change from light brown to dark brown, the final product being a viscous liquid. This product may be used as such but since it is generally too viscous for injection into oil gathering lines, I prefer to dilute it to the proper viscosity with kerosene or other suitable mineral oil.

The various products produced as described above have been subjected to various tests, both in the field and in the laboratory, and have proven outstanding in breaking petroleum water-in-oil emulsions, such as are commonly met with in oil production. While the effectiveness of these compounds will vary from well to well, depending upon the emulsion produced by the particular well, it has been found that excellent results have been obtained when the products are used in concentrations as low as 150 parts per million, and they are in general very superior in effectiveness to the best of the commercial breakers now on the market.

Having now described my invention, what I claim as new and useful is:

1. The process of resolving emulsions including subjecting a petroleum water-in-oil emulsion to the action of a composition consisting essentially of the reaction product of one mol of a carbonyl selected from the group consisting of aldehydes and ketones and two mols of a polyethylene amine, neutralized to a methyl orange end point with a propylated naphthalene sulfonic acid.

2. The process of resolving emulsions including subjecting a petroleum water-in-oil emulsion to the action of a composition consisting essentially of the reaction product of one mol of a carbonyl selected from the group consisting of aldehydes and ketones and two mols of diethylene triamine, neutralized to a methyl orange end point with a propylated naphthalene sulfonic acid.

3. The process of resolving emulsions including subjecting a petroleum water-in-oil emulsion to the action of a composition consisting essentially of the reaction product of one mol of a carbonyl selected from the group consisting of aldehydes and ketones and two mols of triethylene tetramine, neutralized to a methyl orange end point with a propylated naphthalene sulfonic acid.

4. The process of resolving emulsions including subjecting a petroleum water-in-oil emulsion to the action of a composition consisting essentially of the reaction product of one mol of a carbonyl selected from the group consisting of aldehydes and ketones and two mols of tetraethylene pentamine, neutralized to a methyl orange end point with a propylated naphthalene sulfonic acid.

5. The process of resolving emulsions including subjecting a petroleum water-in-oil emulsion to the action of a composition consisting essentially of the reaction product of one mol of a carbonyl selected from the group consisting of formaldehyde, acetaldehyde, benzaldehyde, heptaldehyde, ethyl hexaldehyde, acetone, methyl ethyl ketone, diethyl ketone, di isopropyl ketone, acetophenone, and methyl isobutyl ketone, and two mols of a polyethylene amine, neutralized to a methyl orange end point with a propylated naphthalene sulfonic acid.

WILLIAM B. HUGHES.

References Cited in the file of this patent

UNITED STATES PATENTS

| Number | Name | Date |
|---|---|---|
| 2,083,224 | De Groote | June 8, 1937 |
| 2,083,225 | De Groote | June 8, 1937 |
| 2,110,837 | Blair | Mar. 8, 1938 |
| 2,223,935 | Daniels et al. | Dec. 3, 1940 |
| 2,250,407 | De Groote et al. | July 22, 1941 |